United States Patent
Heigl et al.

(10) Patent No.: US 7,584,989 B2
(45) Date of Patent: Sep. 8, 2009

(54) GAS BAG MODULE HAVING DEPLOYMENT AID

(75) Inventors: Juergen Heigl, Boebingen (DE); Klaus Spandel, Schwaebisch Gmuend (DE); Sven Kleinschmidt, Mutlangen (DE); Juergen Worsch, Schwaebisch Gmuend (DE)

(73) Assignee: TRW Automotive GmbH, Alfdorf (DE)

( * ) Notice: Subject to any disclaimer, the term of this patent is extended or adjusted under 35 U.S.C. 154(b) by 553 days.

(21) Appl. No.: 11/201,518

(22) Filed: Aug. 11, 2005

(65) Prior Publication Data

US 2006/0043705 A1     Mar. 2, 2006

(30) Foreign Application Priority Data

Aug. 30, 2004     (DE) .................... 10 2004 041 930

(51) Int. Cl.
    *B60R 21/20*     (2006.01)

(52) U.S. Cl. .................. 280/730.2; 280/728.2

(58) Field of Classification Search ............. 280/728.2, 280/730.1, 730.2, 739
See application file for complete search history.

(56) References Cited

U.S. PATENT DOCUMENTS

| | | | |
|---|---|---|---|
| 6,626,456 B2 * | 9/2003 | Terbu et al. | 280/728.2 |
| 6,808,199 B2 * | 10/2004 | Saderholm et al. | 280/730.2 |
| 7,083,188 B2 * | 8/2006 | Henderson et al. | 280/730.2 |
| 2002/0158450 A1 * | 10/2002 | Hoeft et al. | 280/730.2 |
| 2003/0214124 A1 * | 11/2003 | DePottey et al. | 280/739 |
| 2004/0012174 A1 * | 1/2004 | Tanaka et al. | 280/730.2 |
| 2004/0032116 A1 | 2/2004 | Steinbruck et al. | |
| 2005/0225060 A1 * | 10/2005 | Wold | 280/728.2 |
| 2006/0043705 A1 | 3/2006 | Heigl et al. | |

FOREIGN PATENT DOCUMENTS

| | | |
|---|---|---|
| DE | 202004004020 | 8/2004 |
| EP | 0855315 | 7/1998 |

* cited by examiner

*Primary Examiner*—Ruth Ilan
(74) *Attorney, Agent, or Firm*—Tarolli, Sundheim, Covell & Tummino LLP

(57) ABSTRACT

A gas bag module for an occupant restraint system in a vehicle includes a gas bag and a housing. The gas bag (10) is accommodated in the housing and has a tab (16). The tab (16) is attached on the exterior side of the housing such that the tab (16) separates from the housing during a deployment of the gas bag (10).

12 Claims, 2 Drawing Sheets

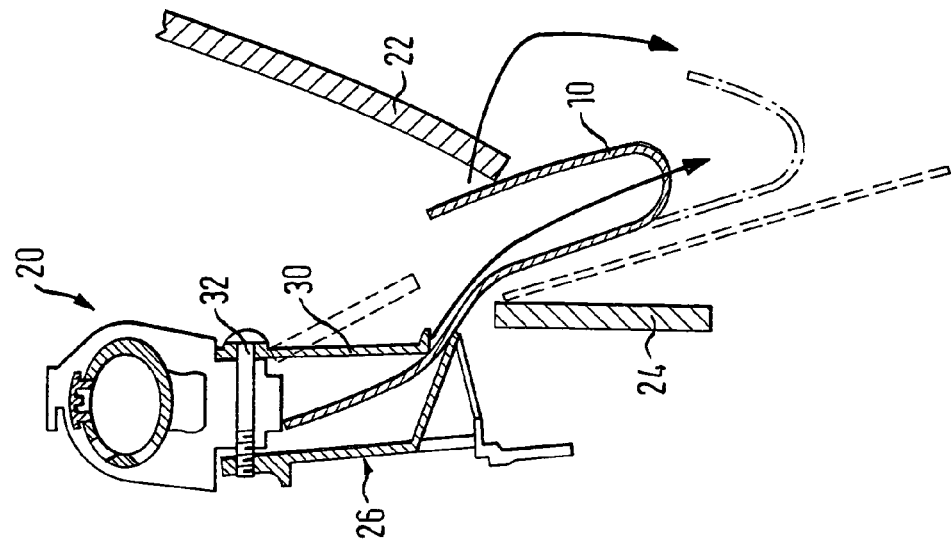
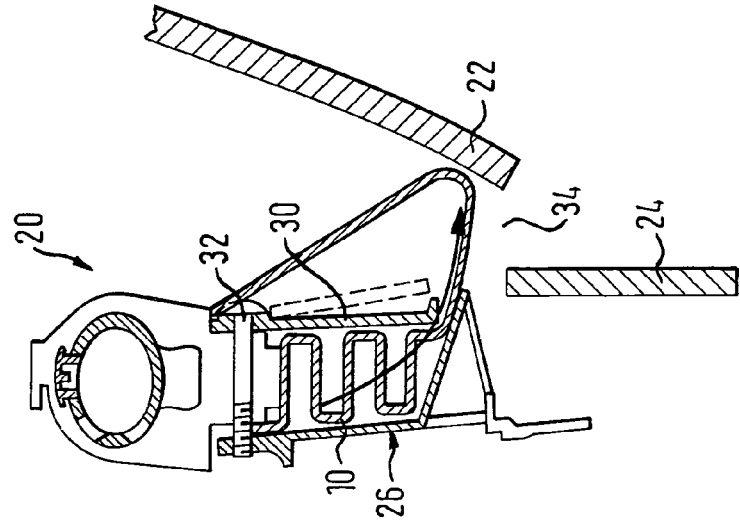
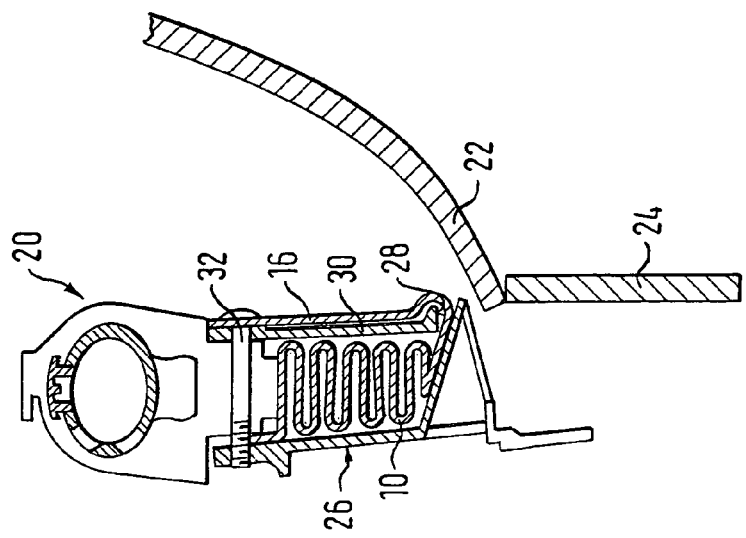

GAS BAG MODULE HAVING DEPLOYMENT AID

FIELD OF THE INVENTION

The present invention relates to a gas bag module for an occupant restraint system in a vehicle.

BACKGROUND OF THE INVENTION

From EP 1 389 568 A2, a gas bag module including a gas bag accommodated in a housing is known in the form of a side gas bag module, which is installed in the transitional area between the roof and the side structure behind the roof liner of the vehicle. In response to a side impact, the roof liner moves in the direction of the vehicle interior, and the gas bag deploys in the downwards direction to protect the vehicle occupant from a direct impact with the side structure.

In particular, reliable protection from the B-, C-, or D-pillar of the vehicle is desirable because there is the danger that a side impact can cause the pillar to be rapidly displaced into the vehicle interior.

It is an object of the invention to provide a gas bag module that features an optimized deployment behavior of the gas bag.

BRIEF SUMMARY OF THE INVENTION

A gas bag module according to the present invention includes a gas bag and a housing; the housing has an exterior side; the gas bag is accommodated in the housing; the gas bag has a tab, which is attached on the exterior side of the housing such that the tab separates from the housing during a deployment of the gas bag. The tab as provided in accordance with the present invention functions as a deployment aid, which, especially at the beginning, brings about a controlled, directed deployment of the gas bag. Thus in the case of a side gas bag module, the tab permits a deployment that is controlled at the beginning and directed towards the vehicle interior. In this manner, it is assured that the gap between the roof liner and the pillar lining of the vehicle is bridged and that subsequently the corresponding pillar is reliably covered by the gas bag. The present invention has the particular advantage that it can be realized in a very cost-effective manner on the basis of any customary gas bag fabric.

Furthermore, by attaching the tab to the housing by an attachment means that at the same time attaches the housing to the vehicle, no additional components are required.

BRIEF DESCRIPTION OF THE DRAWINGS

FIG. 2 depicts a front-side sectional view of a gas bag module according to the present invention;

FIG. 3 depicts the gas bag module from FIG. 2 in a first phase of the gas bag deployment; and FIG. 4 depicts the gas bag module from FIG. 2 in a second phase of the gas bag deployment.

DETAILED DESCRIPTION OF THE PREFERRED EMBODIMENT

Figure 1:
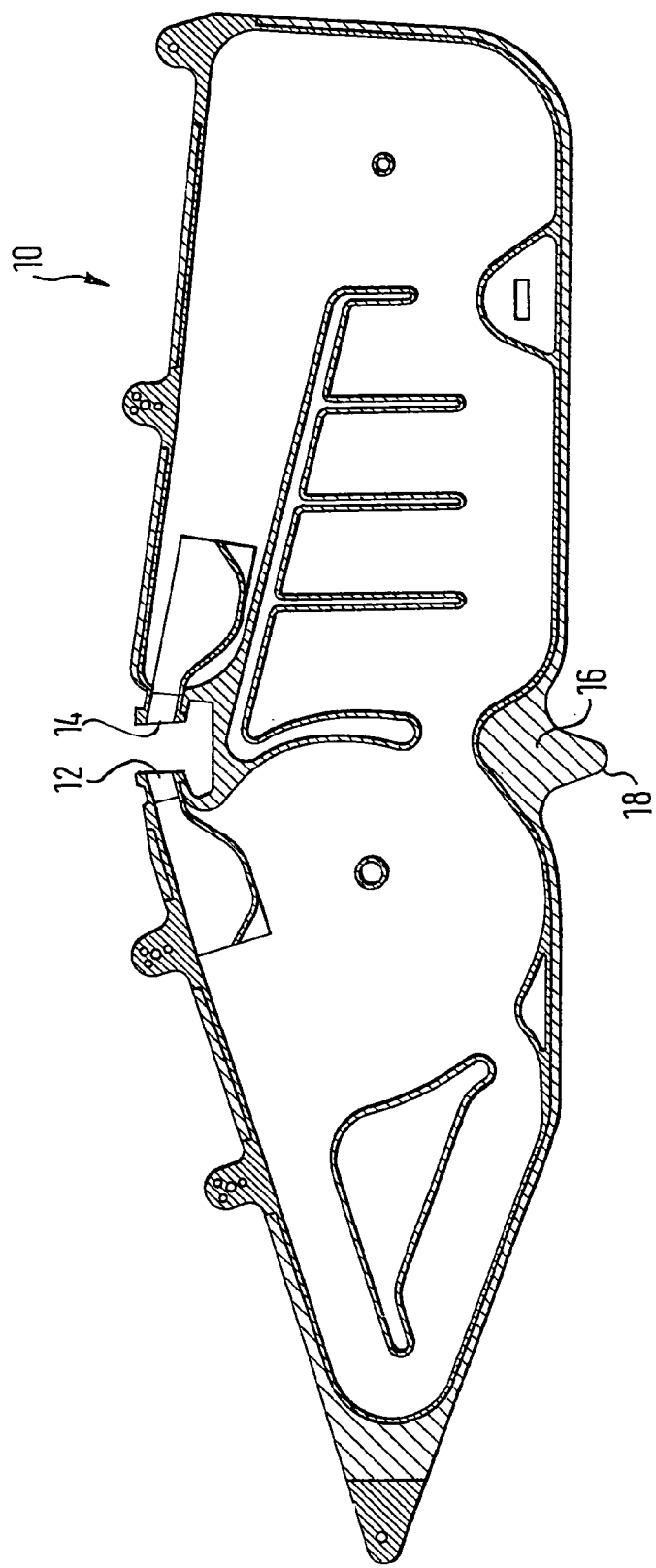
FIG. 1 depicts a side view of a gas bag of a gas bag module according to the present invention in the deployed state.

In FIG. 1, a deployed side gas bag 10 of a central side gas bag module is shown. The gas bag module is installed in a vehicle on the edge of the roof in the area of the B-pillar. Gas bag 10 has an elongated shape and can be filled with gas via two air injection openings 12, 14 opposite each other. At the lower edge of gas bag 10, a tab 16 is provided that has a free end 18. Tab 16, with reference to the longitudinal direction of deployed gas bag 10, is arranged in a central section of gas bag 10, which in the filled state of gas bag 10 covers the B-pillar of the vehicle. Tab 16 is never filled with gas during deployment of the gas bag 10.

In FIG. 2, a side gas bag module 20 according to the present invention is shown in the installed state. The gas bag module 20 has a gas bag 10 as shown in FIG. 1. Module 20 is arranged behind the roof liner of the vehicle and extends in the longitudinal direction on both sides of the B-pillar, which is covered by a lining 24. Gas bag 10, which is folded up in zig-zag fashion, is accommodated in a housing 26 (firing channel) of module 20. Tab 16 emerges from a lower opening 28 of housing 26 and extends along a wall 30 of housing 26 in the upwards direction facing the vehicle interior. Free end 18 of tab 16 is attached to housing 26 on the exterior side by a screw 32 or bolt. The attachment of tab 16 to housing 26 will be discussed in greater detail below. Screw 32, which completely penetrates housing 26, at the same time serves to attach housing 26 to the vehicle.

FIGS. 3 and 4 depict the deployment behavior of gas bag 10 in response to the filling of gas bag 10. Tab 16, which initially contacts housing wall 30, moves toward roof liner 22 and in the process reliably pulls deploying gas bag 10 in the direction of the vehicle interior. In this way, gap 34, which forms between the roof liner and lining 24 of the B-pillar as a result of the roof liner 22 moving toward the inside at a very early stage of the deployment is bridged by gas bag 10.

As the gas bag continues to be filled, the force exerted on the attachment of tab 16 is so great that tab 16 rips out at its free end 18 and moves in the downwards direction along the side of roof liner 22 that is opposite the housing wall. After passing gap 34 between B-pillar lining 24 and roof liner 22, tab 16 turns down and, together with the remainder of gas bag 10, moves in a downwards direction in the vehicle interior.

Of course, the present invention is not limited to protection for the B-pillar of a vehicle, but can also be used with reference to the C- or D-pillar or multiple pillars of the vehicle.

Although the present invention was described on the basis of a side gas bag module, the tab according to the present invention can also be used in a gas bag of a driver, passenger, thorax, pelvis-thorax, or knee gas bag module for a controlled gas bag deployment.

The invention claimed is:

1. A gas bag module for an occupant restraint system in a vehicle, said gas bag module including a gas bag and a housing, said housing having an exterior side, said gas bag being accommodated in said housing, said gas bag having a tab which is attached on said exterior side of said housing such that said tab separates from said housing during deployment of said gas bag, said tab being attached to said housing by an attachment means, said attachment means at the same time attaching said housing to said vehicle.

2. The gas bag module as recited in claim 1, wherein said tab is in contact with a section of said housing that faces an interior of said vehicle.

3. The gas bag module as recited in claim 1, wherein said tab is configured at a lower edge of said gas bag in a deployed state.

4. The gas bag module as recited in claim 1, wherein said tab is arranged on a central section of said gas bag in a deployed state, viewed in a vehicle longitudinal direction.

5. The gas bag module as recited in claim 1, wherein said attachment means is a fastener.

6. The gas bag module as recited in claim 1, wherein said tab is arranged over a pillar lining of said vehicle in an inflated state of said gas bag.

7. A gas bag module for an occupant restraint system in a vehicle, said gas bag module including a gas bag and a housing, said housing having an exterior side, said gas bag being accommodated in said housing, said gas bag having a tab which is attached on said exterior side of said housing such that said tab separates from said housing during deployment of said gas bag, wherein said tab is arranged over a pillar lining of said vehicle in an inflated state of said gas bag.

8. The gas bag module as recited in claim 7, wherein said tab is attached to said housing by an attachment means, said attachment means at the same time attaching said housing to said vehicle.

9. The gas bag module as recited in claim 8, wherein said attachment means is a fastener.

10. The gas bag module as recited in claim 7, wherein said tab is in contact with a section of said housing that faces an interior of said vehicle.

11. The gas bag module as recited in claim 7, wherein said tab is configured at a lower edge of said gas bag in a deployed state.

12. The gas bag module as recited in claim 6, wherein said tab is arranged on a central section of said gas bag in a deployed state, viewed in a vehicle longitudinal direction.

* * * * *